W. F. H. BRAUN.
GANG MOWER.
APPLICATION FILED APR. 28, 1916.
1,299,906.
Patented Apr. 8, 1919.
3 SHEETS—SHEET 2.
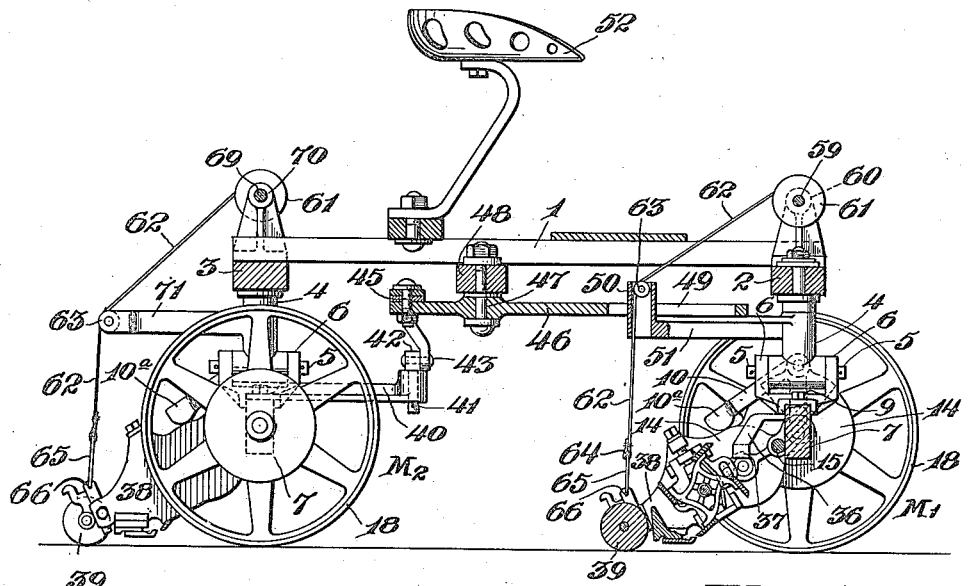
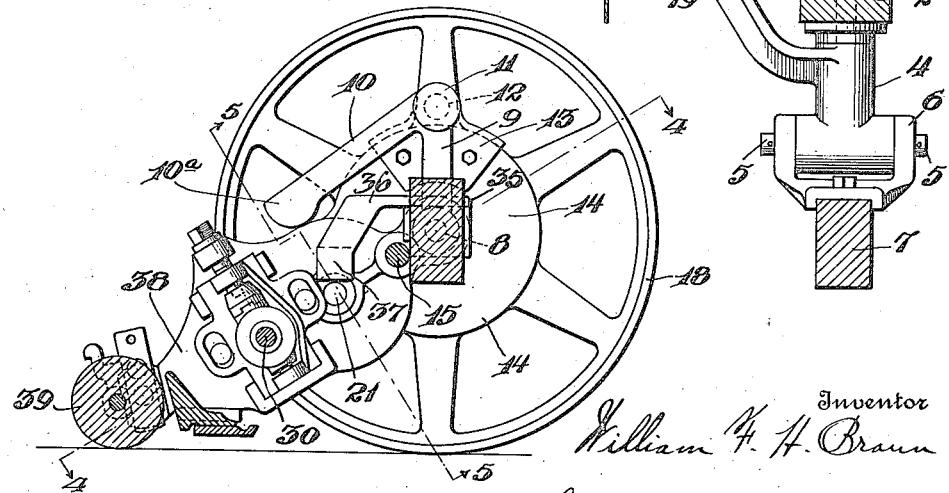

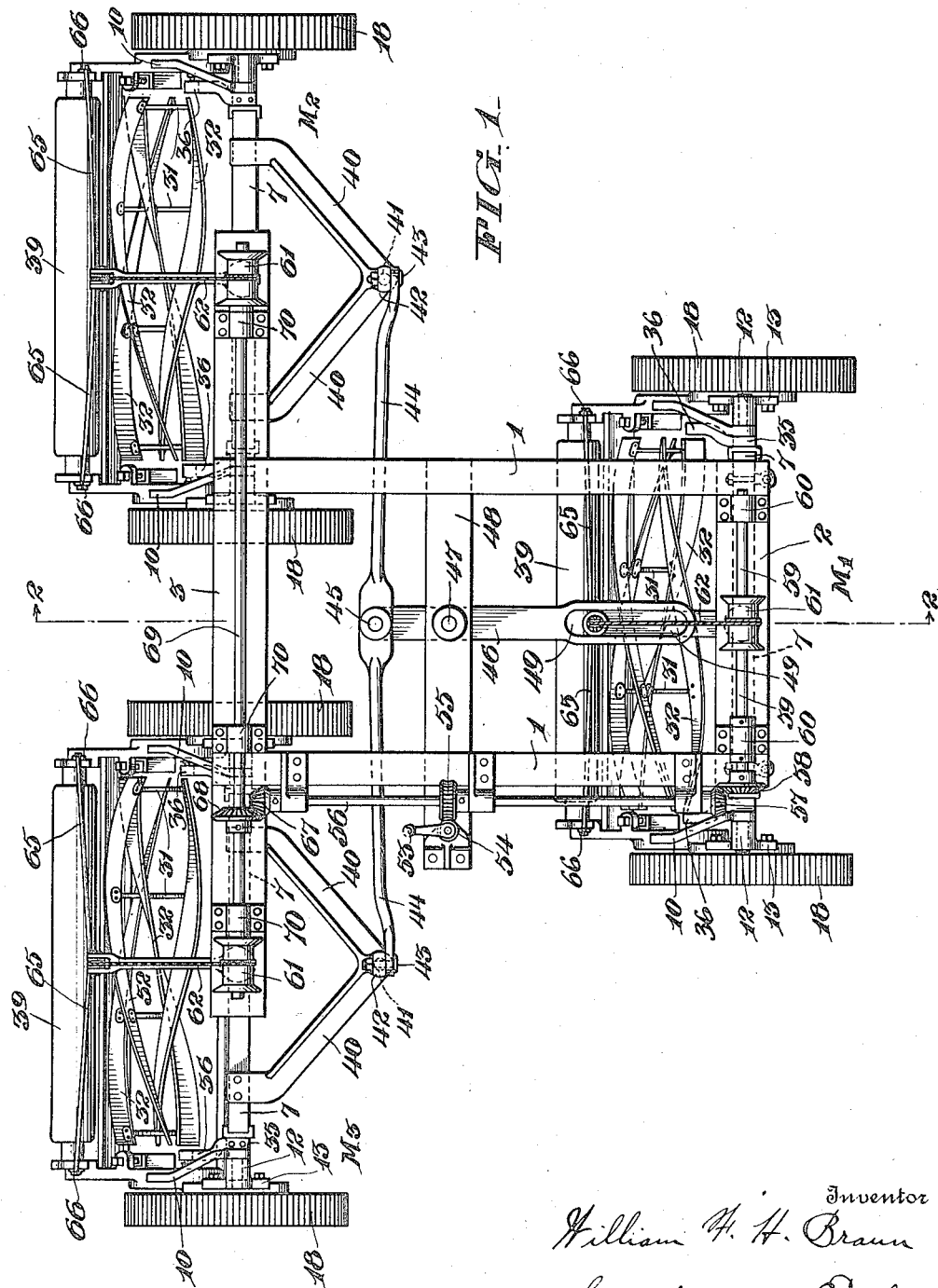

W. F. H. BRAUN.
GANG MOWER.
APPLICATION FILED APR. 28, 1916.

1,299,906.

Patented Apr. 8, 1919.
3 SHEETS—SHEET 3.

Inventor.
William F. H. Braun
Cornelius L. Ehret
By
His Attorney

UNITED STATES PATENT OFFICE.

WILLIAM F. H. BRAUN, OF PHILADELPHIA, PENNSYLVANIA, ASSIGNOR TO PENNSYLVANIA LAWN MOWER WORKS, OF PHILADELPHIA, PENNSYLVANIA, A CORPORATION OF PENNSYLVANIA.

GANG-MOWER.

1,299,906.      Specification of Letters Patent.      Patented Apr. 8, 1919.

Application filed April 28, 1916. Serial No. 94,097.

*To all whom it may concern:*

Be it known that I, WILLIAM F. H. BRAUN, a citizen of the United States, residing in the city of Philadelphia, county of Philadelphia, and State of Pennsylvania, have invented certain new and useful Improvements in Gang-Mowers, of which the following is a specification.

My invention relates to apparatus for mowing lawns and the like, and relates particularly to a gang mower comprised of a plurality of individual lawn mowers pulled or driven in unison.

My invention resides in a gang mower wherein the individual mowers of which it is comprised are movable about vertical pivots or axes to allow the gang mower as a whole to take a curvilinear path or turn corners; and to this end the extents of angular movements of different of the individual mowers are different, to the end that the individual mowers will turn a corner or take a curvilinear path with an amount of slippage of their driving wheels which is negligible.

My invention resides also in novel structure for connecting a mower unit to the means for driving or moving the same over the lawn, and particularly for connecting the individual mower units of a gang mower to the frame or body.

My invention resides also in means for lifting or raising the cutter members of the individual mowers of a gang mower.

And my invention resides further in improved means for automatically disconnecting the cutter member of a mower from the driving wheel when the cutter member is raised or lifted.

For an illustration of one of the forms my invention may take, reference is to be had to the accompanying drawings, in which:

Figure 1 is a top plan view of a gang mower embodying my invention.

Fig. 2 is a sectional view of the same, on line 2—2 of Fig. 1, some parts in elevation.

Fig. 3 is a fragmentary view in side elevation and on larger scale illustrative of features of my invention.

Fig. 6 is a fragmentary vertical elevational view, some parts in section, showing modified arrangement for raising or lifting a mower.

Figure 4:
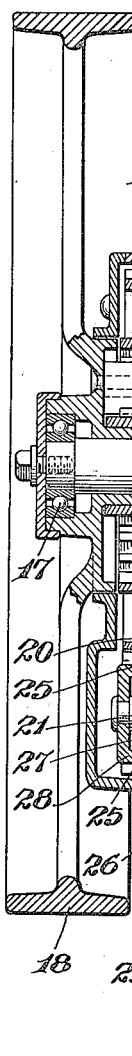
Fig. 4 is a fragmentary sectional view, on larger scale, taken on line 4—4 of Fig. 3, some parts in elevation.

Referring to the drawings, the main frame 60 of the gang mower comprises the side sills 1, 1, the front sill 2 and the rear sill 3.

The three individual mowers are indicated at $M^1$, $M^2$ and $M^3$. As seen in Fig. 1, the cutter of mower $M^1$ overlaps the cutters of mowers $M^2$ and $M^3$.

A T-shaped member 4 is secured to the sill 2 and has pivotal motion with respect thereto about a vertical axis. Through the horizontal portion of the T member 4 extends a pivot pin 5 with respect to which the member 4 can partake of pivotal movement about a horizontal axis. The pivot pin 5 is held in the bracket 6 which is secured to the bar 7 to which latter or to sill 2 may be attached the draft rigging by which the gang mower is pulled over the lawn by a horse or by any suitable means. At each end of the bar 7 is a bearing $7^a$ in which a pin 8 is held for pivotal movement therein, Figs. 3 and 5. Upon each pin 8 is mounted a bell crank lever having the arms 9 and 10, of which the arm 9 has at its lower end a hole receiving the pin 8 which is secured therein in fixed relation to the arm 9 by a small pin $8^a$. At the junction 11 of the arms 9 and 10 of the bell crank lever the same is pivoted by pin 12 upon the bracket 13 secured upon the gear casing 14, the gear casings 14 at opposite ends of the individual mower being connected together by the usual tie rod 15. In each gear casing 14 is secured the short shaft 16, Fig. 4, preferably coaxial with the pin 8, upon which rotates on the ball bearing 17 the mower driving wheel 18 which rolls in contact with the lawn and which has its periphery roughened, as indicated at Fig. 1, in the well known manner.

Secured to the hub of the wheel 18 is the usual driving pawl or dog 19 operating when the mower is moving forwardly to drive the gear wheel 20 and when moving backwardly to disengage from and fail to drive the gear 20, in the well known manner.

Figure 5:
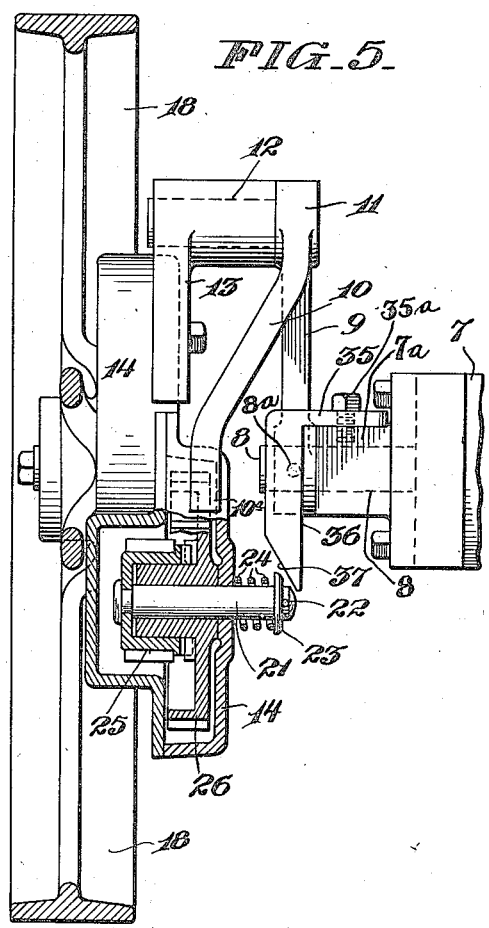
Fig. 5 is a sectional view, on larger scale, taken on line 5—5 of Fig. 3, some parts in elevation.

Extending through the wall of the gear casing 14 is the short shaft or pin 21 which is movable to the right and left longitudinally as viewed in Figs. 4 and 5. Extending through the outer end of the shaft 21 is a pin 22 against which is disposed the collar 110

23 between which and the gear casing 14 is disposed the helical spring 24 which forces the pin 21 toward the right. On the inner end of the shaft or pin 21 is carried the pinion 25 meshing with and driven by the gear 20. Rotatable upon the shaft 20 is the gear 26 whose hub 27 is received into the hollow hub 28 of the pinion 25. With the parts in the position shown in Figs. 4 and 5 the pinion 25 is clutched to and drives the gear 26, which in turn drives the pinion 29 secured upon the shaft 30 upon which are secured the arms 31 on whose outer ends are carried the cutting blades 32.

The pinion 25 carries lugs or projections 33 adapted to engage in the spaces between lugs or projections 34 on the gear 26. Through engagement of these lugs 33 and 34 with each other the pinion 25 drives the gear 26 under normal conditions. However, when the shaft 21 is shifted toward the left, the lugs 33 on pinion 25 disengage from the lugs 34 on the gear 26, and therefore the blades 32 are no longer driven even when the wheel 18 continues to revolve. The members or side frames 14, 38 serve as supports for the rotary cutter mechanism comprising the blades 32.

As seen in Figs. 1, 2, 3 and 5 there is secured by screw 35$^a$ on each end of the bar 7 on bearing 7$^a$ a member 35 having the part 36 extending downwardly toward the outer end of the pin or shaft 21 which is rounded or beveled. The end 37 of the member 36 is beveled or otherwise suitably shaped, as indicated in Figs. 2, 3 and 5.

When the cutters 32 are raised or lifted, by means hereinafter described, away from operative cutting relation with the lawn, these cutters and the gear casing 14 swing upon the shaft 16 as the center, the wheels 18 remaining in contact with the lawn.

In so rising the pin 21 engages with its rounded or beveled end against the beveled surface 37 of the member 36, with the result that the pin 21 is forced in opposition to the spring 24 toward the left, Fig. 5, with the result that the pinion 25 is automatically disengaged from the gear 26 though continuing in mesh with gear 20, with the result that the cutters 32 are no longer rotated and come to rest, notwithstanding the fact that the wheels 18 continue to move forwardly over the lawn.

Secured to or forming an extension of each of the gear casings 14 is a downwardly or rearwardly extending web or arm 38 in which is pivoted the wooden or other roller 39 which rolls in contact with the lawn in the well known manner.

The bell crank lever having the arms 9 and 10 above described forms the driving connection between the bar 7 and the individual mower.

As the bar 7 is moved or pulled forwardly, a forward pull is exerted upon the gear housings 14 through the brackets 13 in which are pivoted the bell crank levers whose ends 10$^a$ engage the gear housings 14. This causes the wheels 18 to roll forwardly upon the ground, and in consequence drive the cutters through the hereinbefore described gearing.

While the foregoing description has been that of the mechanism of an individual mower, as M$^1$, the same description applies to the individual mowers M$^2$ and M$^3$ which latter, however, have their bars 7 secured to the rear sill 3, and T members 4, pivot pins 5 and brackets 6 intervening between the rear sill 3 and the bars 7 to afford each of the bars 7 a pivotal movement both about a vertical axis and about a horizontal axis 5 extending in the direction of movement of the mower.

These horizontal pivotal movements of each of the individual mowers allows it readily to accommodate itself to any variations in the surface of the lawn and to maintain proper cutting relation with respect thereto.

To the bar 7 of each of the rear mowers M$^2$ and M$^3$ are secured on opposite sides of its vertical pivotal connection with the sill 3 the two arms 40 forming a bracket or yoke in which is pivotally movable the pin 41 having at its upper end a boss 42 through which extends horizontal pin 43 to which is connected the bar 44, common to both mowers M$^2$ and M$^3$. The bar 44 is pivoted at 45 to the rear end of the lever 46 pivoted at 47 to the bar 48 secured to the frame of the gang mower.

In its forward end the lever 46 has the longitudinal slot or opening 49 into which extends the hollow vertical extension 50 on the lever or arm 51 integral with or secured to the vertical part of the T member 4 of mower M$^1$. Through these members last described the bar 7 of the front individual mower M$^1$ is connected to the bars 7, 7 of the rear individual mowers M$^2$ and M$^3$.

When the gang mower is moved in a curvilinear path or turns a corner the bar 7 of the front mower M$^1$ will move through a certain or suitable angle on its vertical pivot of the T member 4, the vertical portion of the T member 4 and the arm 51 moving through the same angle. This causes the vertical extension 50 on the arm 51 to engage an inner wall of the slot 49 and thereby move the lever 46 about its vertical pivot 47, causing the pin 45 to move the bar 44 and through the pins 43 and 41 and arms 40 move the bars 7 of the rear mowers M$^2$ and M$^3$ through a certain angle, which angle, however, is substantially less than the angle through which the bar 7 of the front mower M$^1$ is moved to accomplish the turning movement of the gang mower. By the mechanism described the bars 7 of the rear mowers M² and M³ remain parallel with each other, but they assume an angle with respect to the longitudinal extent of the sill 3. By so moving both rear mowers M² and M³ to a suitable and smaller angle the turning movement of the gang mower, or its movement in a curvilinear path, is easily accomplished without any digging or catching of the driving wheels 18 of the rear mowers into the surface of the lawn. This will readily be understood if it be assumed that the rear mowers M² and M³ are immovable about their vertical pivots and remain in the positions indicated in Fig. 1, while the front mower M¹ or the gang mower as a whole is caused to turn a corner or move in a curvilinear path. In such case, assuming that the front of the gang mower, Fig. 1, were moved toward the bottom of the drawing, the wheel 18 of mower M³ nearest the bottom of the drawing will have to move a much smaller distance over the lawn surface than the topmost wheel 18 of the mower M². There would therefore be a relatively great slippage of the lowermost wheel 18 and there would be less slippage of the upper wheel 18 of the mower M³ and still less slippage of the lower wheel 18 of the mower M². To prevent this amount of slippage the mechanism described is provided and the movement of the mowers M² and M³ about their vertical pivots, though through an angle smaller than the angle through which the front mower M¹ is moved, prevents excessive slipping and digging and catching in the lawn surface and allows the gang mower as a whole readily to turn sharp corners or move in any curvilinear path and to change its direction of movement.

The operator may ride upon the gang mower in the seat 52. Within his reach is the crank 53, Fig. 1, which drives a worm 54 meshing with the worm gear 55 secured upon the shaft 56. On the front end of the shaft 56 is a bevel gear 57 driving the bevel gear 58 secured upon the shaft 59 having bearings 60 carried in the sill 2. Secured upon the shaft 59 is the drum 61 to which is secured one end of the chain or rope 62 which passes over the idler or pulley 63 mounted inside of the extension 50 on lever 51. The chain or rope 62 after passing over the pulley 63 extends through the extension 50 and connects at 64 with the bail 65 whose ends connect with ears 66 upon the extension 38 on the gear casing 14.

Similarly at the rear end of the shaft 56 is a bevel gear 67 driving the bevel gear 68 which in turn drives the shaft 69 having bearings 70 upon the rear sill 3. Upon this shaft 69 are secured the drums 61, 61 upon which are wound the chains or ropes 62 which pass over pulleys 63 pivoted in the outer ends of the arms 71 secured to or integral with the vertical portions of the T members 4. The ropes or chains 62 connect to the bails 65 connected to the ears 66 on the web or extension members 38 on the casings 14.

When the operator wishes to lift the cutters of the several mowers free from the lawn he rotates the crank 53 and so drives the shafts 59 and 69 and causes the drums 61 to wind up the ropes or chains 62 and so lift the gear casings 14 and cutters which in rising move about the shafts 16 as centers, eventually causing the pins or shafts 21 to engage the beveled members 37 and so disconnect the cutters 32 from the gear train operated by the wheels 18.

In Fig. 6 a modified mechanism for lifting the mowers is illustrated. In this case the shafts 59 and 69 may have secured thereon bevel gears 72 which drive bevel gears 73 to which are secured sprocket wheels 74 which drive sprocket chains 75 which in turn drive sprocket wheels 76 whose hubs are threaded upon the bolts 77 extending freely through the bosses 78 on the ends of the arms 79 secured to or integral with the vertical portions of the T members 4. Rotation of the shafts 59 and 69 causes sprocket wheels 76 to rotate, and since they are confined between the bosses 78 but are threaded upon the bolts 77, these bolts will move vertically and thereby lift the cutter mechanisms through the connection of the ropes 100 or chains 80 connected to the bails 65.

What I claim is:

1. A gang mower comprising a frame, a plurality of individual lawn mowers having lawn engaging wheels and cutters driven thereby, a vertical pivot for each of said individual mowers connecting the same to said frame for movement about a vertical axis, and horizontal pivots extending in the direction of movement of said frame upon which said individual mowers partake of transverse pivotal movement.

2. A gang mower comprising a frame, a plurality of individual lawn mowers having lawn engaging wheels and cutters driven by said wheels, a driving member for each of said individual mowers, said frame supported on said driving members, and means pivoting each of said driving members to said frame on vertical and horizontal axes.

3. A gang mower comprising a frame, a plurality of individual lawn mowers having lawn engaging wheels and cutters driven thereby, said individual mowers pivoted to said frame for movement about vertical axes, and levers connecting said individual mowers whereby movement of one of them about its vertical pivotal axis causes movement of the others of said individual mowers about their vertical axes.

4. A gang mower comprising a frame, a plurality of individual lawn mowers having lawn engaging wheels and cutters driven thereby, said individual mowers pivoted to said frame for movement about vertical axes, and levers connecting said individual mowers whereby movement of one of them about its vertical pivotal axis causes similar but less angular movement of the others of said individual mowers about their vertical axes.

5. A gang mower comprising a frame, a plurality of individual lawn mowers having lawn engaging wheels and cutters driven by said wheels, mower driving members pivoted to said frame on vertical axes, driving connections between said driving members and said individual mowers, and means connecting said driving members whereby a movement of one of them about its vertical pivotal axis causes movement of the others of said driving members.

6. The combination with a lawn mower comprising lawn engaging driving wheels, cutter mechanism driven thereby, and a support for said cutter mechanism carried by said wheels, of a driving member for moving said mower over the lawn, and a bell crank lever pivoted to said support, one arm of said bell crank lever engaging said support, and another arm of said bell crank lever connected to said driving member.

7. The combination with a lawn mower comprising lawn engaging driving wheels, cutter mechanism driven thereby, and a support for said cutter mechanism carried by said wheels, of a driving member for moving said mower over the lawn, and a bell crank lever pivoted to said support, one arm of said bell crank lever engaging said support, and another arm of said bell crank lever pivoted to said driving member.

8. The combination with a lawn mower comprising lawn engaging driving wheels, rotary cutter mechanism driven thereby, and a support for said cutter mechanism supporting the same between said wheels, of a driving member extending transversely between said wheels for moving the mower over the lawn, and a connection between each end of said driving member and said support comprising a member, a pivot connecting the same to said support, and engaging said support at a distance from said pivot, and a pivotal connection between said member and said driving member.

9. A lawn mower comprising a cutter member, a support therefor, a wheel rotating in contact with the lawn for driving said cutter, said cutter support supported on said wheel, a driving member, a bell crank lever pivoted on said cutter supporting member, an arm of said lever connected to said driving member substantially co-axial with said driving wheel, and another arm of said lever pressing against said cutter supporting member.

10. A lawn mower comprising a cutter member, a support therefor, a wheel rotating in contact with the lawn for driving said cutter, said cutter support supported on said wheel, a driving member, a bell crank lever pivoted on said cutter supporting member, an arm of said lever connected to said driving member, another arm of said lever pressing against said cutter supporting member, a clutch forming a driving connection between said driving wheel and said cutter member, and means secured to said driving member engaged when said cutter member is raised to actuate said clutch whereby said cutter member is disconnected from said driving wheel.

11. In a gang mower, the combination with a frame, of a mower having a lawn engaging wheel and cutter mechanism driven thereby and pivoted thereon, means pivoting said mower on said frame on a vertical axis, and an arm extending radially from the pivotal axis, and means engaging and movable with respect to said arm and attached to said cutter mechanism for raising the same.

12. Lawn mower structure comprising ground engaging wheels, cutter mechanism driven by at least one of said wheels, a support for said cutter mechanism carried by said wheels, a transversely extending driving member, and a member pivoted by said supporting member above the axis of said wheels and pivoted to said driving member.

13. Lawn mower structure comprising driving wheels, cutter mechanism driven by at least one of said wheels, supports for said cutter mechanism carried by said wheels, a transversely extending member secured in fixed relation to said supports, a transversely extending driving member, and a pivotal connnection at each end of said driving member with one of said supporting members at a distance from the axis of said wheels.

14. Lawn mower structure comprising driving wheels, cutter mechanism driven by at least one of said wheels, supports for said cutter mechanism carried by said wheels, a transversely extending member secured in fixed relation to said supports, a transversely extending driving member, and a member pivoted on each of said supporting members and pivoted to said driving member.

15. Lawn mower structure comprising driving wheels, cutter mechanism driven by at least one of said wheels, supports for said cutter mechanism carried by said wheels, a transversely extending member secured in fixed relation to said supports, a transversely extending driving member, and a bell crank lever pivoted on each of said supporting members, one end of said bell crank lever pivoted to said driving member, and another arm of said bell crank lever engaging said support.

16. A gang lawn mower comprising a plurality of individual mower units, a mower unit comprising a ground engaging wheel, cutter mechanism driven thereby, a support for said cutter mechanism carried by said wheel, a driving member, a member carried by said supporting member pivoted to said driving member, a frame common to said mower units, and a connection from said driving member to said frame.

17. A gang lawn mower comprising a plurality of individual mower units, a mower unit comprising a ground engaging wheel, cutter mechanism driven thereby, a support for said cutter mechanism carried by said wheel, a driving member, a member pivoted on said supporting member and pivoted to said driving member, a frame common to said mower units, and a connection from said driving member to said frame.

18. A gang lawn mower comprising a plurality of individual mower units, a mower unit comprising a ground engaging wheel, cutter mechanism driven thereby, a support for said cutter mechanism carried by said wheel, a driving member, a bell crank lever pivoted on said support, one arm of said lever pivoted to said driving member, another arm of said lever pressing against said support, a frame common to said mower units, and a connection between said driving member and said frame.

19. A gang lawn mower comprising a plurality of individual mower units, a mower unit comprising a ground engaging wheel, cutter mechanism driven thereby, a support for said cutter mechanism carried by said wheel, a driving member, a member carried by said supporting member pivoted to said driving member, a frame common to said mower units, and a pivotal connection between said driving member and said frame permitting vertical oscillation thereof with respect to said frame.

20. A gang lawn mower comprising a plurality of individual mower units, a mower unit comprising a ground engaging wheel, cutter mechanism driven thereby, a support for said cutter mechanism carried by said wheel, a driving member, a member pivoted on said supporting member and pivoted to said driving member, a frame common to said mower units, and a pivotal connection between said driving member and said frame permitting vertical oscillation thereof with respect to said frame.

21. A gang lawn mower comprising a plurality of individual mower units, a mower unit comprising a ground engaging wheel, cutter mechanism driven thereby, a support for said cutter mechanism carried by said wheel, a driving member, a bell crank lever pivoted on said support, one arm of said lever pivoted to said driving member, another arm of said lever pressing against said support, a frame common to said mower units, and a pivotal connection between said driving member and said frame permitting vertical oscillation thereof with respect to said frame.

In testimony whereof I have hereunto affixed my signature this 24th day of April, 1916.

WILLIAM F. H. BRAUN.